THOMAS A. EDISON.

Improvement in Type-Wheels for Printing-Telegraphs.

No. 126,528.  Patented May 7, 1872.

126,528

UNITED STATES PATENT OFFICE.

THOMAS A. EDISON, OF NEWARK, NEW JERSEY, ASSIGNOR TO GOLD AND STOCK TELEGRAPH COMPANY, OF NEW YORK CITY.

IMPROVEMENT IN TYPE-WHEELS FOR PRINTING-TELEGRAPHS.

Specification forming part of Letters Patent No. 126,528, dated May 7, 1872.

*To all whom it may concern:*

Be it known that I, THOMAS A. EDISON, of Newark, in the county of Essex and State of New Jersey, have invented and made an Improvement in Printing-Telegraphs, and the following is declared to be a full and correct description of the same.

In an application for Letters Patent of like date herewith, the type-wheels of a printing-telegraph instrument are shown, constructed so that they can be expanded and contracted in order that the larger wheel may be printed from without impressing from the smaller or contracted wheel.

My present invention is a modification of the devices above mentioned; and the same consists of type-wheels with hubs fitting loosely upon the type-wheel shaft, but connected by screws and slots to disks secured to and revolving with said shaft. Conical-ended sleeves are also upon the type-wheel shaft, and they are arranged and operated so that when one sleeve is within the hub of one wheel, said wheel will be concentric with its shaft, and may be printed from; but the other sleeve will be out of the hub of its wheel, and allow a spring to act upon the lower portion of the wheel, and raise it sufficiently to prevent an impression while the other wheel is being printed from. A locking-bar, moving with the sleeves, locks the wheel, which is concentric with the shaft.

Figure 1:
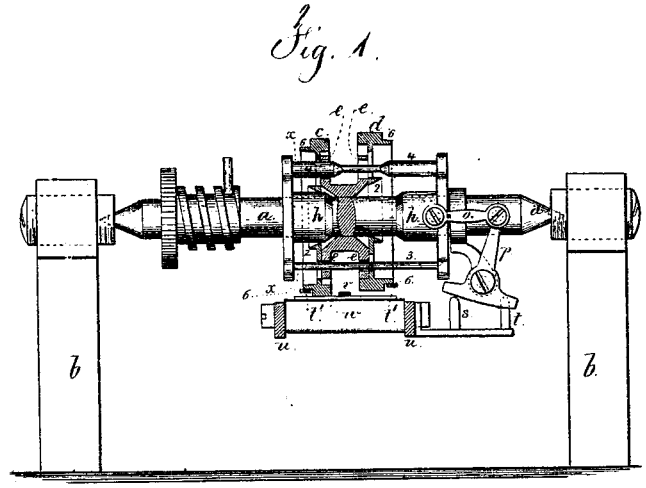
Figure 2:
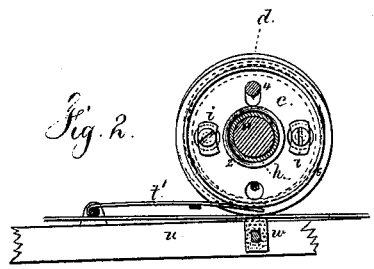
Figure 3:
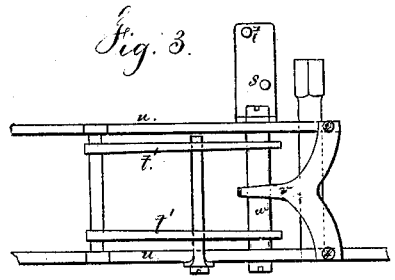

In the drawing, Figure 1 is an elevation of a type-wheel shaft with the wheels in section. Fig. 2 is a section at the line $x$ $x$; and Fig. 3 is a plan of a portion of the printing-lever.

$a$ is the type-wheel shaft, mounted in the side frames $b$ $b$, and this shaft is to be revolved by a step-by-step motion, as usual. $e$ $e$ are disks secured to the shaft $a$, and revolving with the same; and to these disks $e$ $e$ the type-wheels $c$ $d$ are loosely connected by the screws and slots at $i$ $i$ that keep the type-wheels in contact with the disks, but allow of free lateral motion. Each type-wheel is made with a hub, 2, surrounding the shaft $a$, but of larger diameter, so that a conical-ended sleeve, $h$, may enter said hub to center the wheel and bring it concentric with the shaft $a$. There are two of these sleeves $h$ upon the shaft $a$, and connected to each other by the rods 3 and 4, the latter being also a locking-bar to prevent any lateral movement of the wheel, which is concentric with the shaft $a$. This locking-bar is made with a small portion in the middle, so that it will allow the free movement of the wheel that is not locked, but will fill up the hole in the wheel that is locked, and thereby keep it in position. These sleeves are arranged as shown in Fig. 1, and are moved by the T-lever $p$, which is connected to one of the sleeves by the link $o$, and this lever $p$ is moved by one of the pins $s$ $t$ on the upward movement of the printing-lever $u$ when the type-wheel is at the blank point.

It will now be understood that when one of the type-wheels is upon its sleeve $h$, it is concentric with the shaft $a$, and may be printed from; the other wheel is off of its sleeve, and, if not otherwise provided for, would hang loosely upon the shaft and blur the paper when an impression was made from the other wheel. To prevent this I provide springs $t'$ $t'$, that may be secured to the printing-lever $u$, and these springs take against flanges 6 upon the respective type-wheels $e$ $d$, and the wheel which is loose upon the shaft is kept up by the spring $t'$ in the position shown in Figs. 1 and 2, so that the lower portion of the wheel is higher than the lower portion of the other wheel, and cannot make an impression upon the paper. A spring-finger, $v$, is employed to keep the strip of paper in contact with the impression-pad $w$ and prevent blurring.

I claim as my invention—

1. The type-wheels $c$ $d$, each connected to the disk $e$, but allowed to move laterally, in combination with the sliding sleeves $h$ $h$, substantially as specified.

2. The locking-bar 4 and springs $t'$ $t'$, in combination with the laterally-moving type-wheels, substantially as and for the purposes set forth.

Signed by me this 23d day of January, A. D. 1872.

T. A. EDISON.

Witnesses:
GEO. T. PINCKNEY,
CHAS. H. SMITH.